US012596008B2

(12) United States Patent　　　　(10) Patent No.:　US 12,596,008 B2
Ji　　　　　　　　　　　　　　　　　　(45) Date of Patent:　　　Apr. 7, 2026

(54) METHOD AND APPARATUS FOR GENERATING TRAVEL PATH BASED ON DISTANCE AND ROAD CLASS

(71) Applicant: 42DOT INC., Seoul (KR)

(72) Inventor: Seung Hyun Ji, Seoul (KR)

(73) Assignee: 42DOT INC., Seoul (KR)

( * ) Notice: Subject to any disclaimer, the term of this patent is extended or adjusted under 35 U.S.C. 154(b) by 230 days.

(21) Appl. No.: 18/257,357

(22) PCT Filed: Dec. 13, 2021

(86) PCT No.: PCT/KR2021/018851
§ 371 (c)(1),
(2) Date: Jun. 14, 2023

(87) PCT Pub. No.: WO2022/131716
PCT Pub. Date: Jun. 23, 2022

(65) Prior Publication Data
US 2024/0027197 A1　　Jan. 25, 2024

(30) Foreign Application Priority Data

Dec. 15, 2020　(KR) ........................ 10-2020-0175496

(51) Int. Cl.
G01C 21/34　　　(2006.01)
G01C 21/20　　　(2006.01)
(52) U.S. Cl.
CPC ............. G01C 21/34 (2013.01); G01C 21/20 (2013.01)
(58) Field of Classification Search
CPC ................................ G01C 21/34; G01C 21/20
See application file for complete search history.

(56) References Cited

U.S. PATENT DOCUMENTS 5,938,720 A * 8/1999 Tamai ................ G01C 21/3446
701/411
9,784,589 B1 10/2017 Gyenes
(Continued)

FOREIGN PATENT DOCUMENTS

JP　　2011-220902 A　　11/2011
JP　　2013205256 A　　10/2013
(Continued)

OTHER PUBLICATIONS

Dennis Schieferdecker, Systematic Combination of Speed-Up Techniques for exact Shortest-Path Queries (Year: 2008).*
International Search Report Dated Jun. 23, 2022.

*Primary Examiner* — Scott A Browne
*Assistant Examiner* — Terry C Buse
(74) *Attorney, Agent, or Firm* — Harvest IP Law, LLP

(57)　　　　　ABSTRACT

The present disclosure relates to a method and apparatus for performing multipath search. The method according to an embodiment of the present disclosure may calculate a distance between an origin point and a destination point in a group of destination points. In addition, the method may generate a travel path between the origin point and the destination point using a first path-finding method when the distance between the destination point and the origin point is less than a threshold value, and generate the travel path between the origin point and the destination point using a second path-finding method when the distance between the destination point and the origin point is greater than or equal to the threshold value.

8 Claims, 14 Drawing Sheets

(56)         References Cited

U.S. PATENT DOCUMENTS

| | | | |
|---|---|---|---|
| 2007/0244632 A1* | 10/2007 | Mueller | G01C 21/3446 |
| | | | 701/533 |
| 2011/0113155 A1* | 5/2011 | Kuznetsov | G01C 21/3446 |
| | | | 709/241 |
| 2011/0158232 A1* | 6/2011 | Nesbitt | H04L 45/12 |
| | | | 370/389 |
| 2014/0088870 A1 | 3/2014 | Varoglu | |
| 2020/0132482 A1* | 4/2020 | Beaurepaire | G08G 1/143 |

FOREIGN PATENT DOCUMENTS

| | | | |
|---|---|---|---|
| KR | 10-2010-0089218 A | 8/2010 |
| KR | 10-2013-0111801 A | 10/2013 |
| KR | 10-1468871 B1 | 11/2014 |
| KR | 10-2017-0042539 A | 4/2017 |
| KR | 10-2019-0093318 A | 8/2019 |
| KR | 10-2300928 B1 | 9/2021 |
| KR | 10-2021-0126257 A | 10/2021 |

* cited by examiner

ROAD OF CLASS 1
ROAD OF CLASS 2
ROAD OF CLASS 3
ROAD OF CLASS 4
ROAD OF CLASS 5

|  | DESTINATION POINT 1 | DESTINATION POINT 2 |
|---|---|---|
| ROAD CLASS | 3 | 5 |
| MOVEMENT | × | 3 |

|  | DESTINATION POINT 1 | DESTINATION POINT 2 |
|---|---|---|
| ROAD CLASS | 3 | 5 |
| MOVEMENT | × | 3 |

|  | DESTINATION POINT 1 | DESTINATION POINT 2 |
|---|---|---|
| ROAD CLASS | 3 | 5 |
| MOVEMENT | × | 3 |

|  | DESTINATION POINT 1 | DESTINATION POINT 2 | DESTINATION POINT 3 | DESTINATION POINT 4 | DESTINATION POINT 5 |
|---|---|---|---|---|---|
| ROAD CLASS | 3 | 5 | 2 | 3 | 4 |
| MOVEMENT | × | 3 | × | × | 3 |

METHOD AND APPARATUS FOR GENERATING TRAVEL PATH BASED ON DISTANCE AND ROAD CLASS

CROSS REFERENCE TO RELATED APPLICATION(S)

This application is a National Stage of International Application No. PCT/KR2021/018851 filed on Dec. 13, 2021, claiming priority based on Korean Patent Application No. 10-2020-0175496 filed on Dec. 15, 2020.

TECHNICAL FIELD

The present disclosure relates to a method and apparatus for performing multipath search.

BACKGROUND ART

In general, a demand response transport (DRT) system also called a small train, a small autonomous track vehicle, an unmanned track taxi, or the like is a next-generation urban traffic system, and is a new traffic system being developed to remove defects such as air pollution and traffic congestion while maintaining the convenience of automobiles.

The DRT system is a concept of operating an unmanned automatic driving vehicle on network-type paths, and the unmanned automatic driving vehicle enables passengers of 2 to 6 to ride thereon and is dispatched at the request of the passenger, and when a destination point is determined, the unmanned automatic driving vehicle selects an optimal path among various paths on the network to perform non-stop operation.

However, when multipath search is performed based on a single algorithm in the DRT system, excessive time may be consumed for the search. Accordingly, research on a method of efficiently searching for multiple paths is necessary.

The background technology described above is technical information that the inventor(s) of the present disclosure has achieved to derive the present disclosure or has achieved during the derivation of the present disclosure, and thus, it cannot be considered that the background technology has been published to the public before the filing of the present disclosure.

DESCRIPTION OF EMBODIMENTS

Technical Problem

The present disclosure is directed to providing a method and apparatus for performing multipath search. The problem to be solved by the present disclosure is not limited to the above-mentioned problem, and other problems and advantages of the present disclosure, which are not mentioned, can be understood by the following description, and will be more clearly understood from the embodiments of the present disclosure. It will also be appreciated that the problem and advantages to be solved by the present disclosure may be implemented by the means and combinations thereof indicated in the claims.

Technical Solution to Problem

As a technical means for achieving the above-described technical task, a first aspect of the present disclosure provides a method of performing multipath search, the method including calculating a distance between an origin point and a destination point in a group of destination points, and generating a travel path between the origin point and the destination point using a first path-finding method when the distance between the destination point and the origin point is less than a threshold value and generating the travel path between the origin point and the destination point using a second path-finding method when the distance between the destination point and the origin point is greater than or equal to the threshold value.

A second aspect of the present disclosure provides an apparatus for performing multipath search, the apparatus including a memory in which at least one program is stored, and a processor configured to perform a calculation by executing the at least one program, wherein the processor performs calculating a distance between an origin point and a destination point in a group of destination points, and generating a travel path between the origin point and the destination point using a first path-finding method when the distance between the destination point and the origin point is less than a threshold value and generating the travel path between the origin point and the destination point using a second path-finding method when the distance between the destination point and the origin point is greater than or equal to the threshold value.

A third aspect of the present disclosure provides a computer-readable recording medium recording a program for executing the method according to the first aspect on a computer.

In addition, another method for implementing the present disclosure, and another system and a computer-readable recording medium for storing a computer program for executing the method may be further provided.

Other aspects, features, and advantages other than the above-described features will be apparent from the following drawings, claims, and detailed descriptions of the disclosure.

Advantageous Effects of Disclosure

According to the above-described technical solution of the present disclosure, multiple travel paths can be effectively generated by differently applying a path-finding method according to a distance between an origin point and a destination point and thus reducing a search time.

BEST MODE

Figure 1:
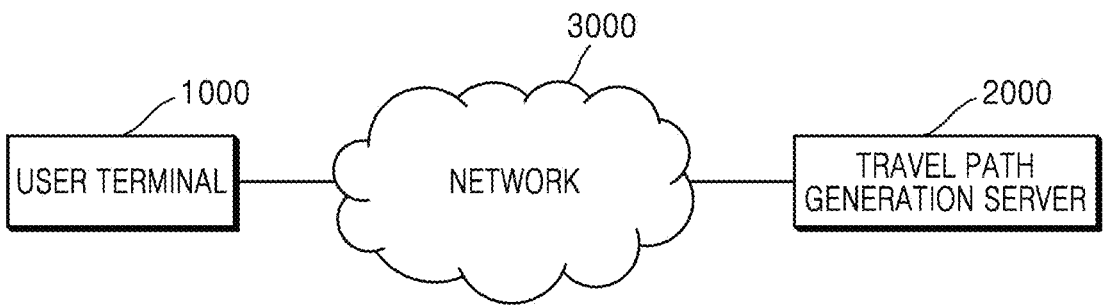
FIG. 1 is a system diagram including a user terminal and a travel path generation server according to an embodiment.

The present disclosure relates to a method and apparatus for performing multipath search. A method according to an embodiment of the present disclosure may calculate a distance between an origin point and a destination point in a group of destination points. In addition, the method may generate a travel path between the origin point and the destination point using a first path-finding method when the distance between the destination point and the origin point is less than a threshold value, and generate the travel path between the origin point and the destination point using a second path-finding method when the distance between the destination point and the origin point is greater than or equal to the threshold value.

MODE OF DISCLOSURE

The advantages and features of the present disclosure and methods of achieving them will be apparent from the embodiments that will be described in detail with reference to the accompanying drawings. However, the present disclosure is not limited to the following embodiments, but may be implemented in various forms different from each other, and is to be understood to include all modifications, equivalents, or substitutions that may be implemented in a variety of different forms and that are within the scope of the ideas and techniques of the present disclosure. The embodiments presented below are only provided to make the disclosure of the present disclosure complete and fully inform those skilled in the technical field to which the present disclosure pertains of the scope of the present disclosure. In describing the present disclosure, detailed descriptions of related well-known technologies will be omitted when it is determined that the detailed description may make the subject matter of the present disclosure unclear.

The terms used herein are for the purpose of describing particular embodiments only and are not intended to be limiting to the present disclosure. Singular forms are intended to include plural forms as well, unless the context clearly indicates otherwise. In the present application, it will be further understood that the terms "comprise", "comprising", "include", and/or "including", when used in this specification, specify the presence of stated features, integers, steps, operations, elements, components, and/or groups thereof but do not preclude the presence or addition of one or more other features, integers, steps, operations, elements, components and/or groups thereof.

Some embodiments of the present disclosure may be represented by functional block configurations and various processing steps. Some or all of these functional blocks may be implemented in various numbers of hardware and/or software configurations that perform particular functions. For example, the functional blocks of the present disclosure may be implemented by one or more microprocessors or by circuit configurations for a predetermined function. In addition, for example, the functional blocks of the present disclosure may be implemented in various programming or scripting languages. The functional blocks may be implemented in algorithms executed on one or more processors. In addition, the present disclosure may employ the related art for electronic environment setting, signal processing, and/or data processing. Terms such as "mechanism", "element", "means", and "configuration" can be used broadly and are not limited to mechanical and physical configurations.

In addition, connection lines or connection members between components shown in the drawings are merely illustrative of functional connections and/or physical or circuit connections. In a practical device, the connections between the components may be represented by various functional connections, physical connections, or circuit connections that may be replaced or added.

Travel paths described below may be applied to various scenarios, such as Bicycle Sharing, Car Sharing, Mobility-on-Demand, Demand Responsive Transport, Mobility Service, Mobility Management, Intermodal Passenger Transport, and Delivering.

Hereinafter, the present disclosure will be described in detail with reference to the accompanying drawings.

FIG. 1 is a system diagram including a user terminal and a travel path generation server according to an embodiment.

The system according to an embodiment may include a user terminal 1000 and a travel path generation server 2000.

The user terminal 1000 may be a smartphone, a tablet personal computer (PC), a PC, a smart television (TV), a mobile phone, a personal digital assistant (PDA), a laptop computer, a media player, a micro-server, a global locating system (GPS) device, an electronic book terminal, a digital broadcast terminal, a navigation device, a kiosk, an MP3 player, a digital camera, a home appliance, a device equipped with a camera, or another mobile or non-mobile computing device. In addition, the user terminal 1000 may be a wearable device, e.g., a watch, glasses, a hair band, or a ring, which has a communication function and a data processing function. However, the present disclosure is not limited thereto.

The travel path generation server 2000 may be implemented by a computer device or a plurality of computer devices that communicate through a network to provide instructions, codes, files, contents, services, and the like.

The travel path generation server 2000 may calculate an estimated travel time required for movement between each of a plurality of points on the basis of information about the points. The travel path generation server 2000 may generate a travel path by determining a travel sequence for the plurality of points on the basis of the estimated travel time.

The user terminal 1000 and the travel path generation server 2000 may perform communication using a network 3000. In an embodiment, an application may be installed in the user terminal 1000, and the travel path generation server 2000 may be a server that manages the application. The travel path generation server 2000 may exchange data with the user terminal 1000 through the application installed in the user terminal 1000.

The network 3000 includes a local area network (LAN), a wide area network (WAN), a value-added network (VAN), a mobile radio communication network, a satellite communication network, or the like, and any combinations thereof. The network 3000 may be a comprehensive data communication network configured to enable each of the network constituent entities depicted in FIG. 1 to smoothly communicate with one another, and may include a wired Internet, a wireless Internet, and a mobile wireless communication network. Further, the wireless communication may include, for example, wireless LAN (Wi-fi), Bluetooth, Bluetooth low energy, Zigbee, Wi-fi direct (WFD), ultra-wideband (UWB), infrared data association (IrDA), near-field communication (NFC), or the like, but the present disclosure is not limited thereto.

Meanwhile, in FIG. 1, the travel path generation server 2000 is illustrated as performing communication with one user terminal 1000 using the network, but this is merely an example, and the travel path generation server 2000 may perform communication with two or more user terminals 1000 using the network.

Figure 2A:
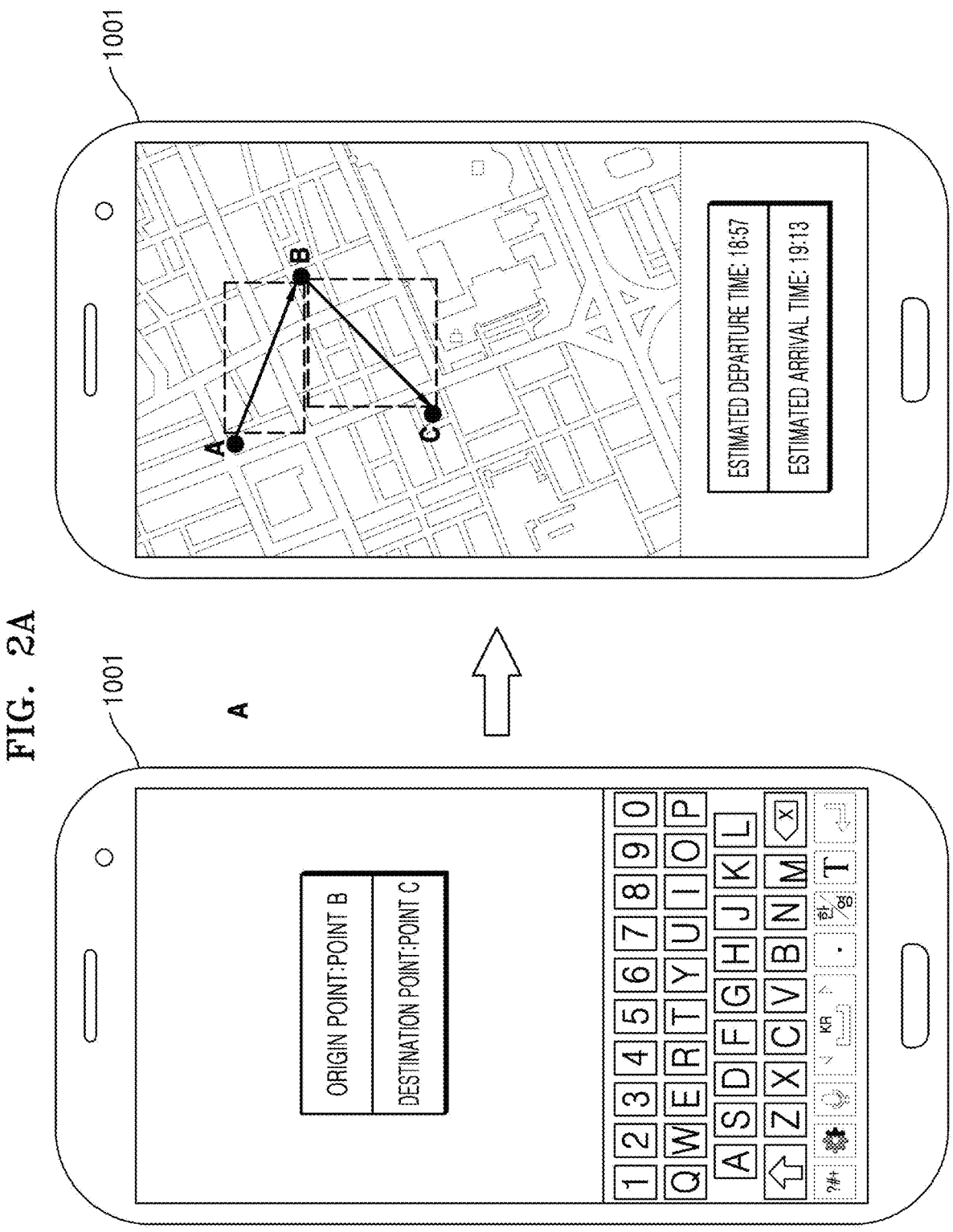
FIGS. 2A and 2B are views for describing an example of providing a travel path from the travel path generation server according to an embodiment to the user terminal.
Figure 2B:
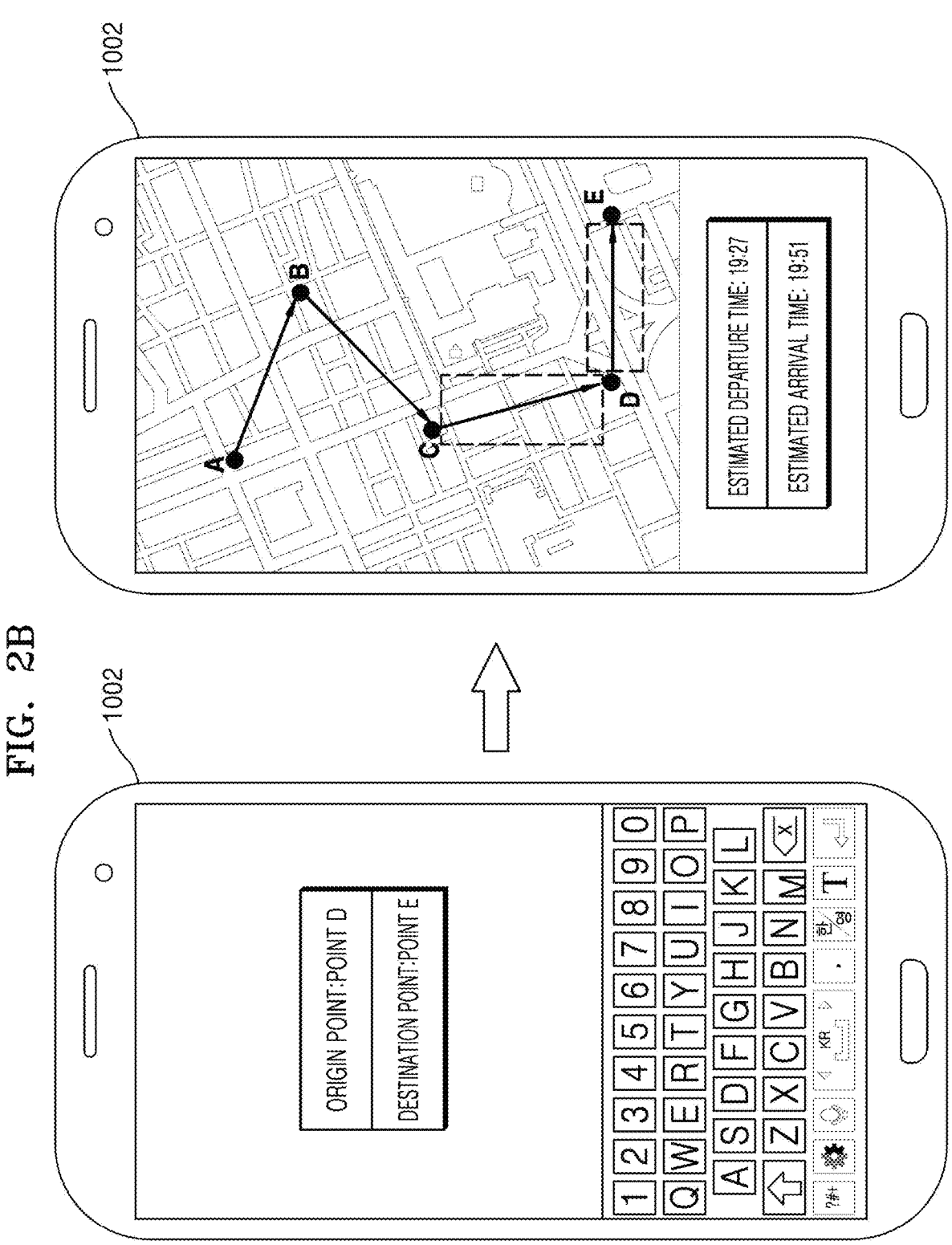

FIGS. 2A and 2B are views for describing an example of providing a travel path from the travel path generation server according to an embodiment to the user terminal.

A first user terminal 1001 and a second user terminal 1002 in FIGS. 2A and 2B are the same as the user terminal 1000 described in FIG. 1, and thus a detailed description thereof will be omitted.

Referring to FIG. 2A, the first user terminal 1001 may receive an input for inputting an origin point and a destination point from a first user. For example, the first user may input "point B" as the origin point and "point C" as the destination point via an input interface of the first user terminal 1001.

The first user terminal 1001 may transmit first journey information including the origin point and the destination point to the travel path generation server 2000. The journey information may include an input time at which the first user inputs the origin point and the destination point, a name of the origin point, a latitude and longitude of the origin point, a name of the destination point, a latitude and longitude of the destination point.

The travel path generation server 2000 may generate a travel path on the basis of the first journey information received from the first user terminal 1001. The travel path may be a path, along which a traveling means (e.g., a bicycle, a scooter, an automobile, or the like) is to be travel, shown on a map.

For example, the travel path generation server 2000 may generate a travel path for traveling from "point A" corresponding to an initial point to "point B" that is the origin point of the first user, and a travel path for traveling from "point B" to "point C" that is the destination point of the first user. Here, the initial point may be a point corresponding to a location of the traveling means at a time point when the input for inputting the origin point and the destination point is received from the first user terminal 1001. Alternatively, the initial point may be a point corresponding to a location of the traveling means at a time point when the travel path generation server 2000 receives the first journey information from the first user terminal 1001.

In FIG. 2A, a travel path for traveling from "point A" to "point B" and traveling from "point B" to "point C" is shown as a straight line, but this is only for convenience of description, and a travel path between each point may be generated along a travelable path on an actual map.

The travel path generation server 2000 may calculate an estimated departure time and an estimated arrival time on the basis of the generated travel path. The travel path generation server 2000 may calculate the estimated departure time and the estimated arrival time using a length of the generated travel path, traffic conditions (e.g., traffic jams), selection options (e.g., shortest distance, shortest time, or the like), and the like. The estimated departure time may refer to a time for the traveling means to depart from "point A" and arrive at "point B", and the estimated arrival time may refer to a time for the traveling means to depart from "point B" and arrive at "point C".

Referring to FIG. 2B, the second user terminal 1002 may receive an input for inputting an origin point and a destination point from a second user. For example, the second user may input "point C" as the origin point and "point D" as the destination point via an input interface of the second user terminal 1002.

The second user terminal 1002 may transmit second journey information including the origin point and the destination point to the travel path generation server 2000. Hereinafter, it is assumed that the travel path generation server 2000 generates the travel path on the basis of the first journey information received from the first user terminal 1001, and then receives the second journey information from the second user terminal 1002.

The travel path generation server 2000 may update the travel path on the basis of the second journey information received from the second user terminal 1002.

For example, after receiving the second journey information, the travel path generation server 2000 may update the travel path by additionally generating, in addition to the existing travel path, a travel path for traveling from "point B" to "point C", which is the origin point of the second user, and a travel path for traveling from "point C" to "point D", which is the destination point of the second user.

In FIG. 2B, the travel path for traveling from "point C" to "point D" and traveling from "point D" to "point E" is shown as a straight line, but this is only for convenience of description, and a travel path between each point may be generated along a travelable path on an actual map.

The travel path generation server 2000 may calculate an estimated departure time and an estimated arrival time on the basis of the generated travel path. The estimated departure time may refer to a time for the traveling means to depart from "point B" and arrive at "point C", and the estimated arrival time may refer to a time for the traveling means to depart from "point C" and arrive at "point D".

In FIG. 2B, the travel path is illustrated as being generated such that the traveling means travels in the order of "point A", "point B", "point C", "point D", and "point E", but this is only an example, and the present disclosure is not limited thereto. For example, the travel path generation server 2000 may generate the travel path by determining a travel sequence between points using Nearest Insertion (NI), Cheapest Insertion (CI), Farthest Insertion (FI), Random Insertion (RI), Evolutionary algorithm, or the like.

Figure 3A:
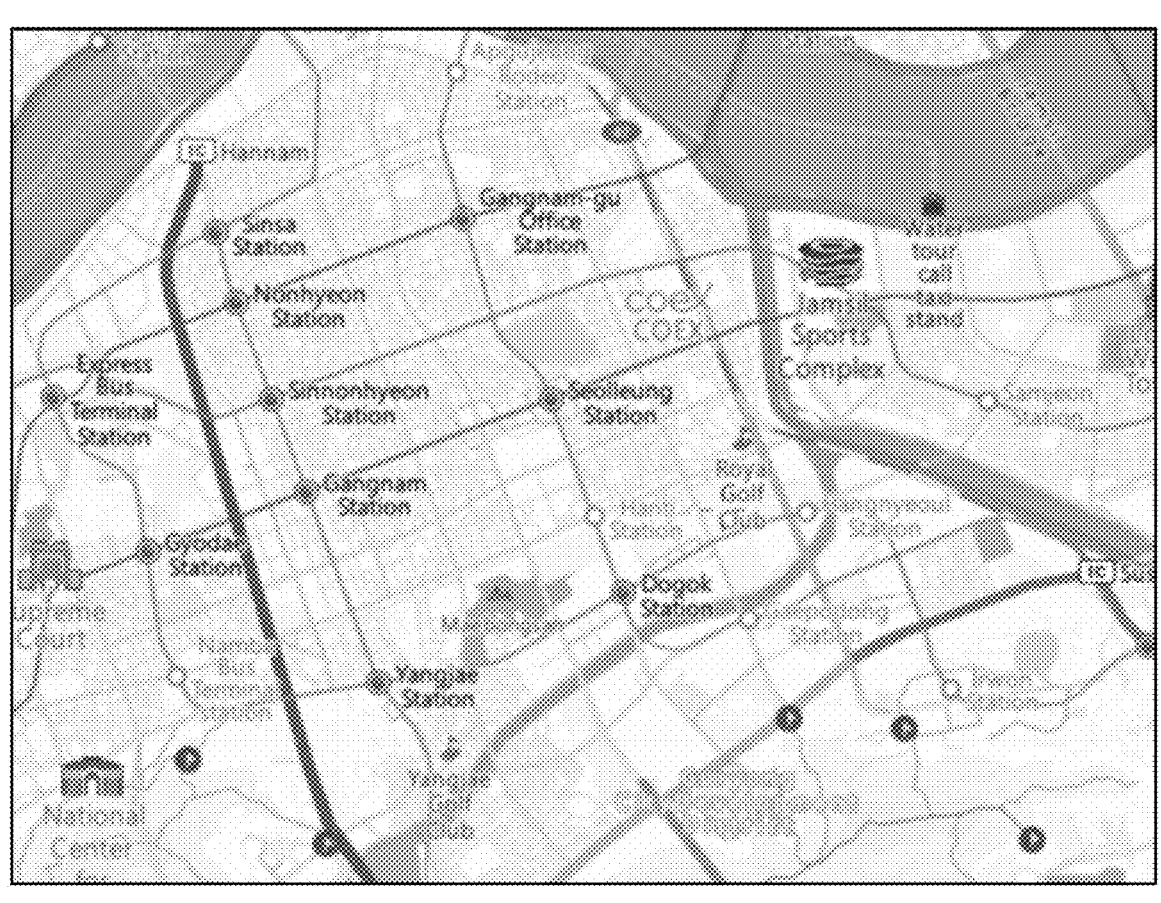
FIGS. 3A and 3B are views for describing road classes according to an embodiment.
Figure 3B:
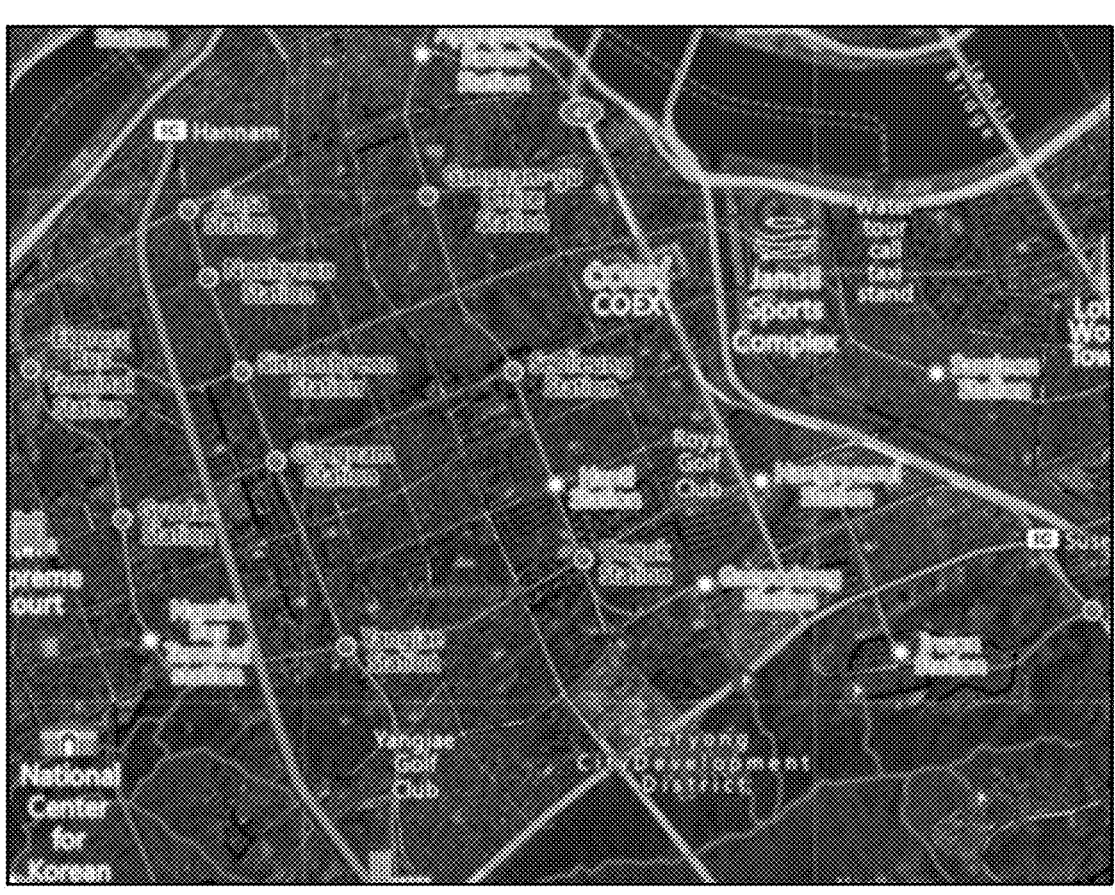

FIGS. 3A and 3B are views for describing road classes according to an embodiment.

Types of the road may include highways, general national roads, local roads, metropolitan city roads, special city roads, city roads, district roads, and ward roads.

The highways are roads that form an important axis of a road traffic network, are road paths that connect major cities and used for high-speed traffic exclusively for automobiles, and are notified by the Minister of Land, Infrastructure, and Transport. The general national roads are road paths that connect major airports, national industrial complexes, tourist destination points, or the like to form a national trunk road network and are notified by the Minister of Land, Infrastructure, and Transport. The local roads are roads that form an arterial road network in the area among the roads in the jurisdiction of a special autonomous province, and are paths notified by the governor of the special autonomous province. The metropolitan city roads or special city roads are roads that are particularly important for maintaining the functions of the corresponding metropolitan city or special city and are notified by the mayor of the metropolitan city or special city. The city roads are road paths that are under the jurisdiction of a special municipality, city, or administrative city, and area paths announced by the special municipality's mayors or mayors. The district roads are roads that are under the jurisdiction of the corresponding district, and are paths announced by the district governor. The ward roads are road paths that connect wards in the jurisdiction of a special city or metropolitan city that is not a special city or metropolitan city, and are paths announced by the ward mayor.

The roads may be classified based on predetermined criteria. Network connectivity should be corrected between roads of the same class. In an embodiment, the roads may be classified from class 1 to class 9 based on the predetermined criteria. The predetermined criteria may include a road type, a road traffic volume, a road width, a road length, and the like, but the present disclosure is not limited thereto.

Meanwhile, in the following description, it will be defined that class 1 corresponds to the highest class and class 9 corresponds to the lowest class.

FIG. 3A is a map in which all roads of class 1 to class 9 are shown. FIG. 3B is a map in which some roads of lower classes are filtered out, specifically, roads with class 6 or less have been filtered out and only roads of class 1 to class 5 are shown.

Figure 4:
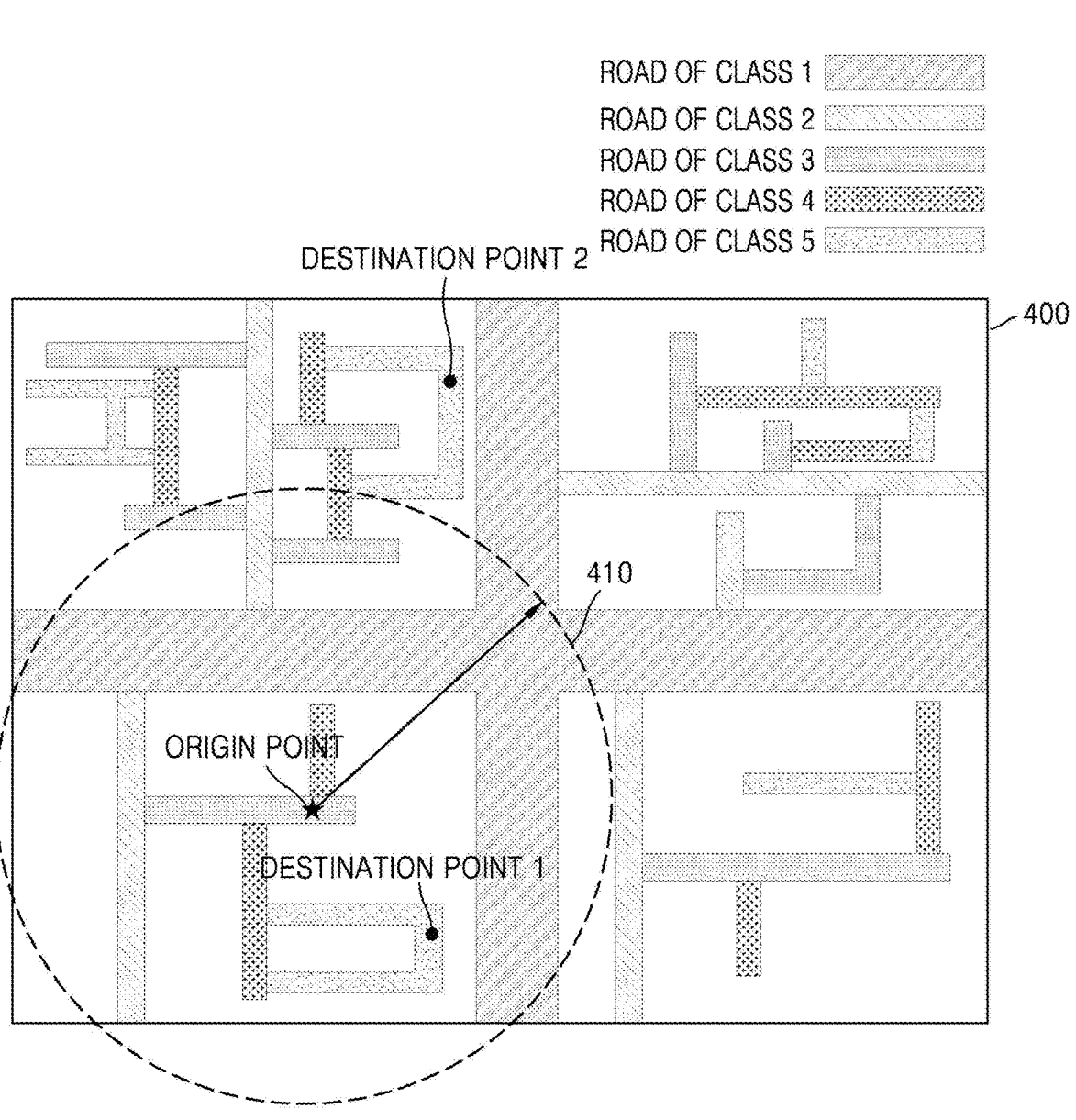
FIG. 4 is a view for describing an example of applying a different path-finding method according to a distance between an origin point and a destination point according to an embodiment.

FIG. 4 is a view for describing an example of applying a different path-finding method according to a distance between an origin point and a destination point according to an embodiment.

Referring to FIG. 4, roads of class 1 to class 5 are shown on a map 400. The class is lowered from sequentially the road of class 1 to the road of class 5. A group of destination points may include destination point 1 and destination point 2.

The travel path generation server 2000 may generate multiple travel paths. The generation of the multiple travel paths means generating n paths from the same single origin point to n different destination points, or n paths from n different origin points to the same single destination point.

The travel path generation server 2000 may generate the multiple travel paths between the origin point and the destination points in the group of destination points. To this end, the travel path generation server 2000 may calculate distances between the origin point and the destination points. Distance calculation methods based on a straight-line distance, a shortest distance, a shortest time, and the like may be used to calculate the distances, but the present disclosure is not limited thereto.

Specifically, when the distance between the origin point and the destination point is less than a threshold value 410, the travel path generation server 2000 may generate a travel path between the origin point and the destination point using a first path-finding method. In addition, when the distance between the origin point and the destination point is greater than or equal to the threshold value 410, the travel path generation server 2000 may generate a travel path between the origin point and the destination point using a second path-finding method. The threshold value 410 may be set to 5 km, 10 km, 15 km, 20 km, or the like, but the present disclosure is not limited thereto.

In an embodiment, the second path-finding method may be a point-to-point (P2P) path-finding method. The P2P path-finding method is a method of generating a path by searching and extending from the origin point to the destination point with a directionality, and generates n origin point-destination point pairs in the form of 1:1 and searches n times to generate n paths. The P2P path-finding method may be based on the Dijkstra algorithm, the A* algorithm, or a bidirectional algorithm.

In an embodiment, the first path-finding method may be a point-to-multi-point (P2M) path-finding method. Unlike the P2P path-finding method, the P2M path-finding method is a method of generating a path by searching and extending in all directions without a directionality, and is a path-finding method in which n paths are generated by one search by searching until all n destination points are reached.

Referring to FIG. 4, destination point 1 has a distance less than the threshold value from the origin point while destination point 2 has a distance greater than or equal to the threshold value from the origin point. In this case, the travel path generation server 2000 may use the first path-finding method to generate a travel path between the origin point and destination point 1 and use the second path-finding method to generate a travel path between the origin point and destination point 2.

In the case of the P2P path-finding method, the path is quickly generated by searching and extending with a directionality from the origin point to the destination point, but when there are n destination points, a search time may be excessive since n searches must be performed. On the other hand, in the case of the P2M path-finding method, when one destination point among the n destination points is farther than the other destination points, a search time may be excessive since the path is searched and extended without a directionality. In the present disclosure, by differently applying the path-finding method according to the distance between the origin point and the destination point, the search time may be reduced, which allows multiple travel paths to be generated effectively.

Figure 5A:
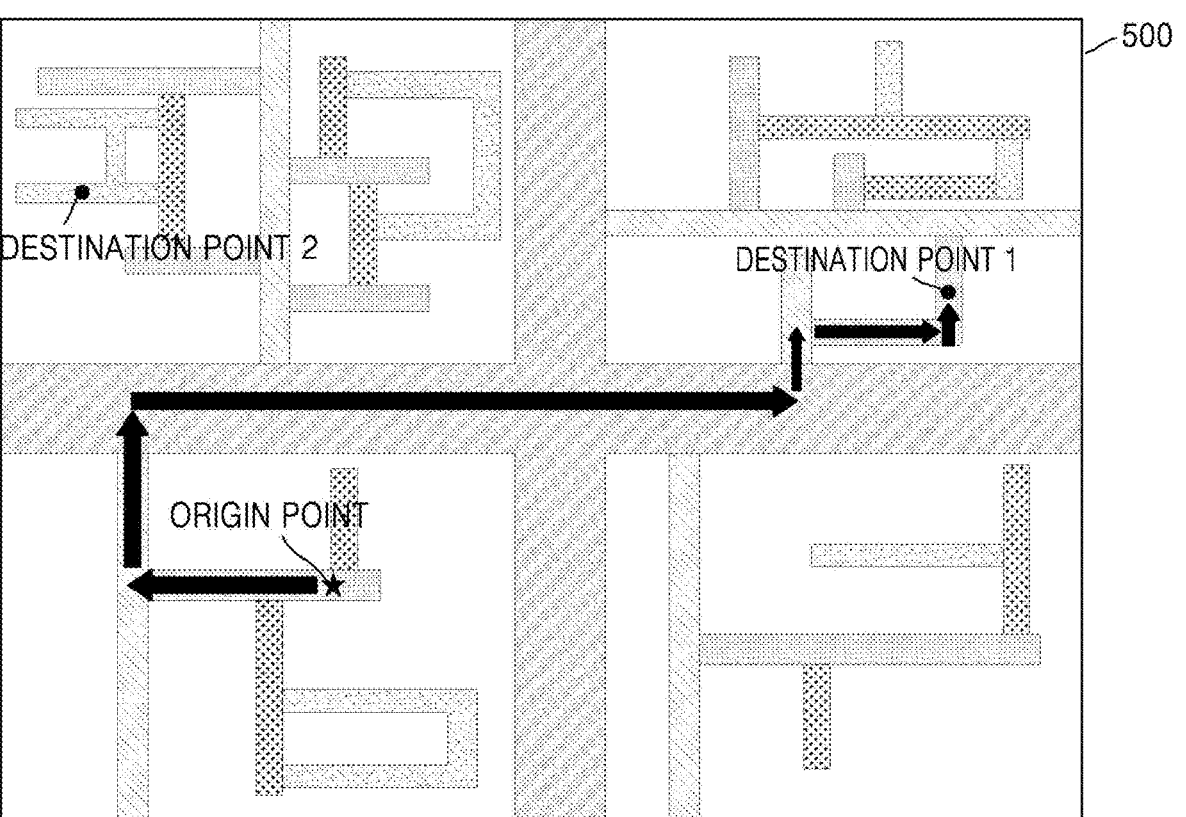
FIGS. 5A and 5B are views for describing an example of generating a travel path according to an embodiment.
Figure 5B:
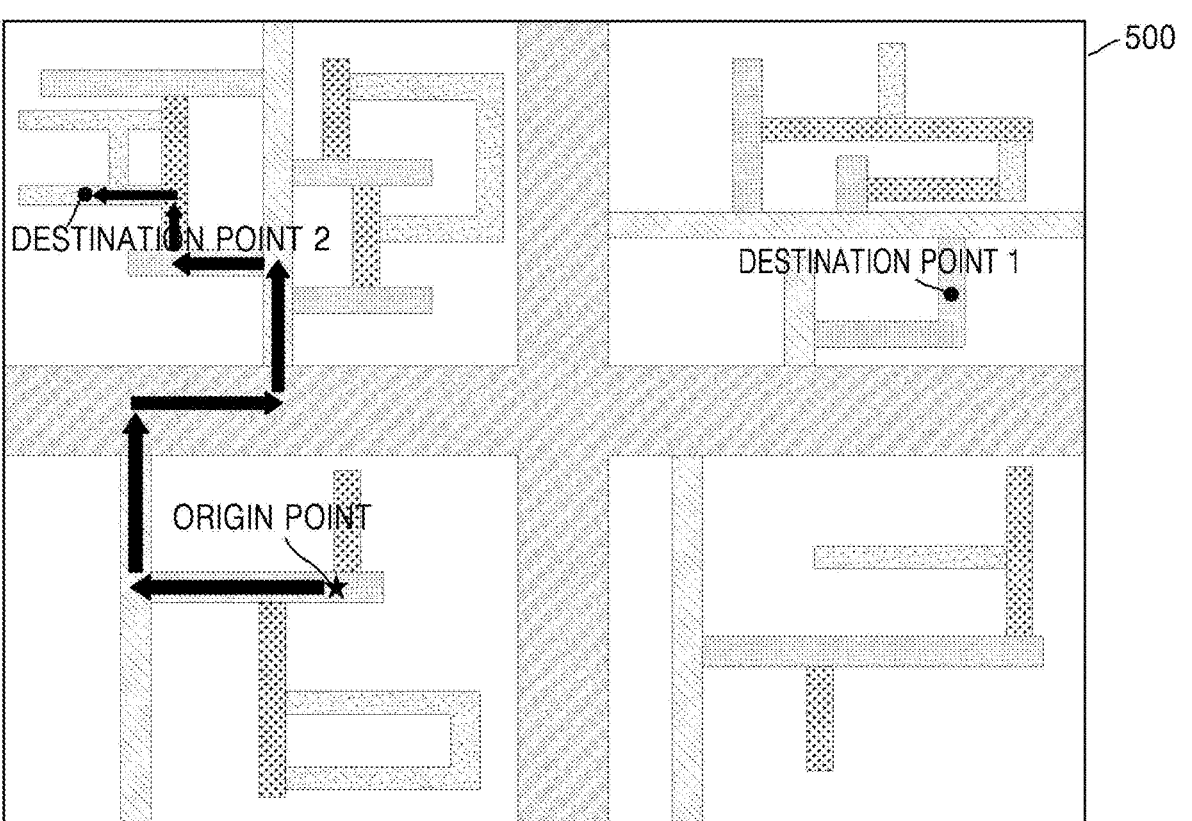

FIGS. 5A and 5B are views for describing an example of generating a travel path according to an embodiment.

Referring to FIGS. 5A and 5B, roads of class 1 to class 5 are shown on a map 500. Destination point 1 may be located on the road of class 3, and destination point 2 may be located on the road of class 5.

Hereinafter, it is assumed that a distance between an origin point and each of destination points 1 and 2 is less than a threshold value, and the P2M path-finding method is applied to generate travel paths between the origin point and destination points 1 and 2.

In a case in which the road classes are not filtered when the travel paths between the origin point and the destination points are generated, the travel path generation server 2000 has to perform a search by extending to all classes of roads from the road of class 1 to the road of the class 5, and thus search time may be excessively consumed. For example, even when the travel path generation server 2000 performs a search by filtering out the roads of class 4 or lower and extending only to from the road of class 1 to the road of class 3, the travel path generation server 2000 can generate a travel path between the origin point and destination point 1.

However, in a case in which the road classes are filtered without moving the location of the destination point when generating the travel path between the origin point and the destination point, the destination point located on the road of a lower class may not be searched. For example, when the travel path generation server 2000 performs a search by filtering out roads of class 4 or lower and extending only to from the road of class 1 to the road of class 3, destination point 2 is not searched because destination point 2 is located on the road of class 5.

Figure 6A:
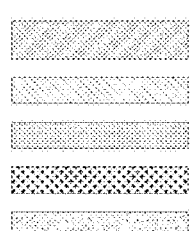
FIGS. 6A to 6C are views for describing an example of generating a travel path between an origin point and a final location of a destination point according to an embodiment.
Figure 6A:
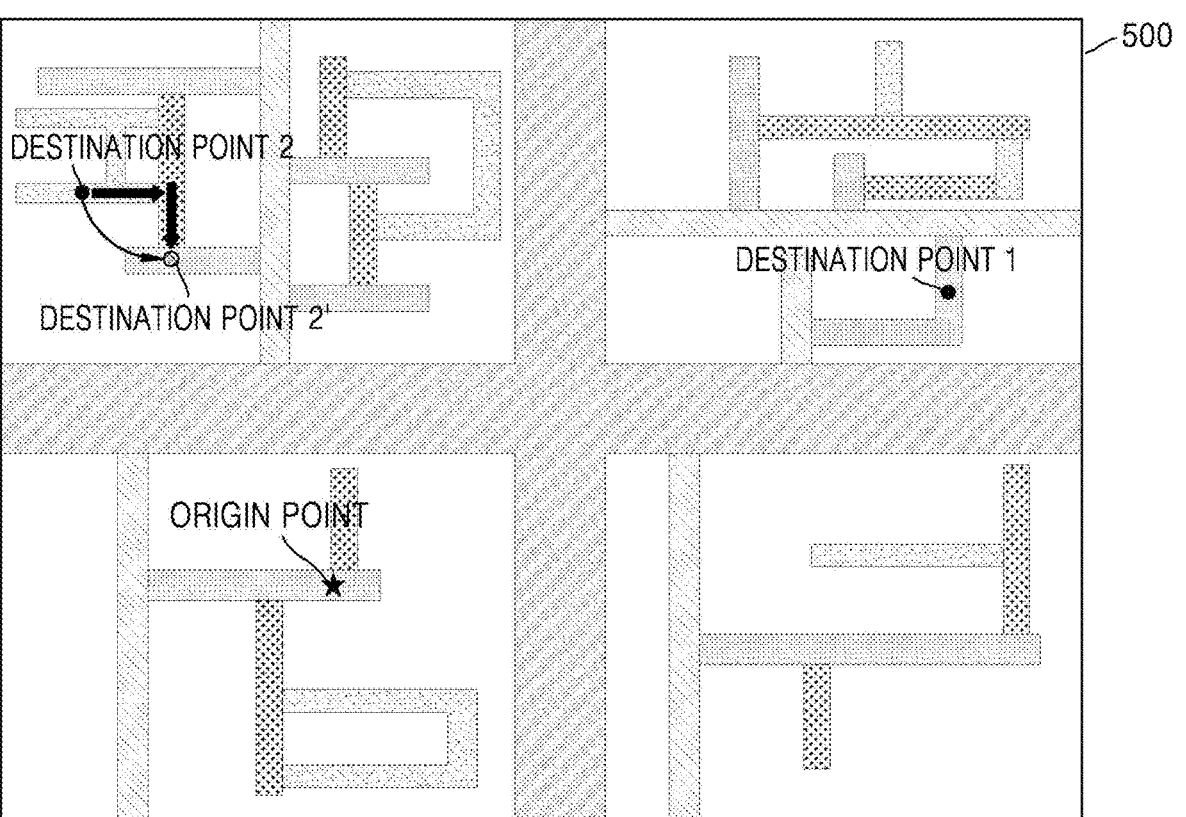
Figure 6B:
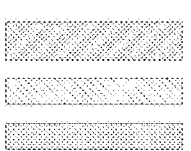
Figure 6B:
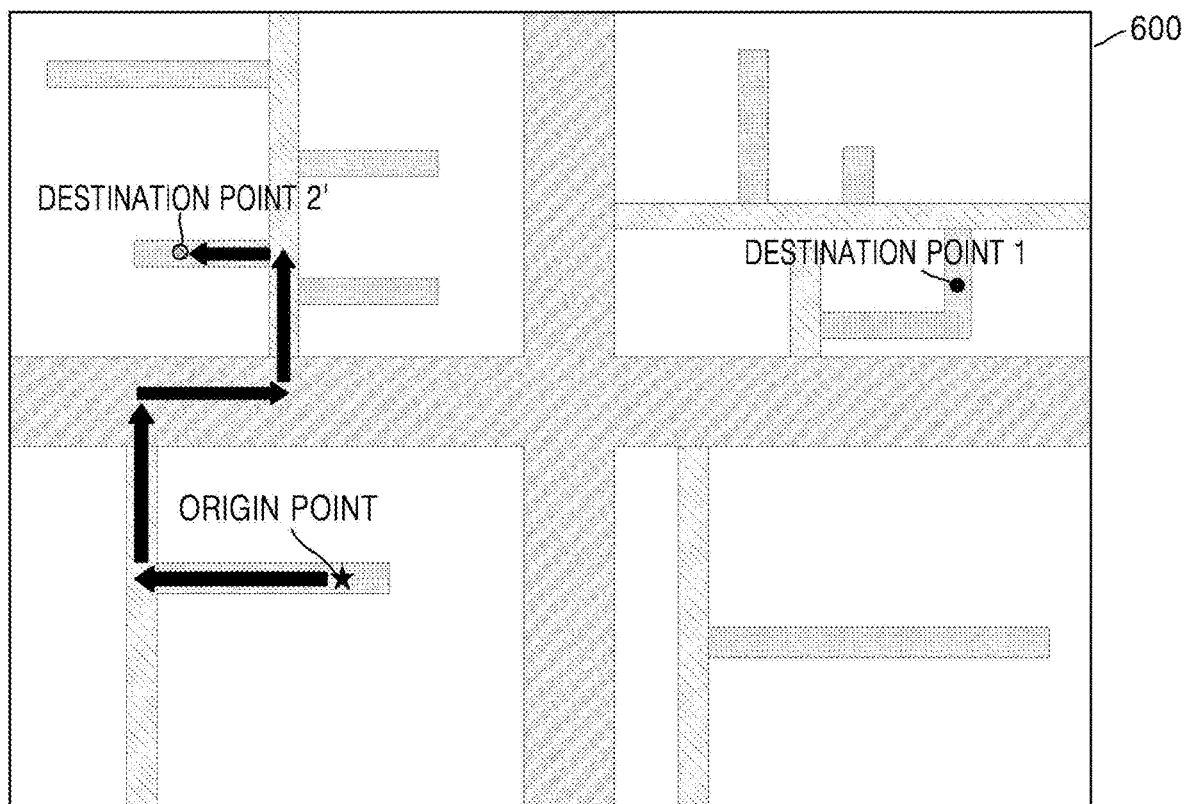
Figure 6C:
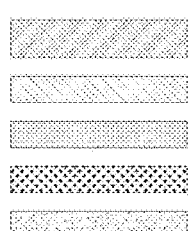
Figure 6C:
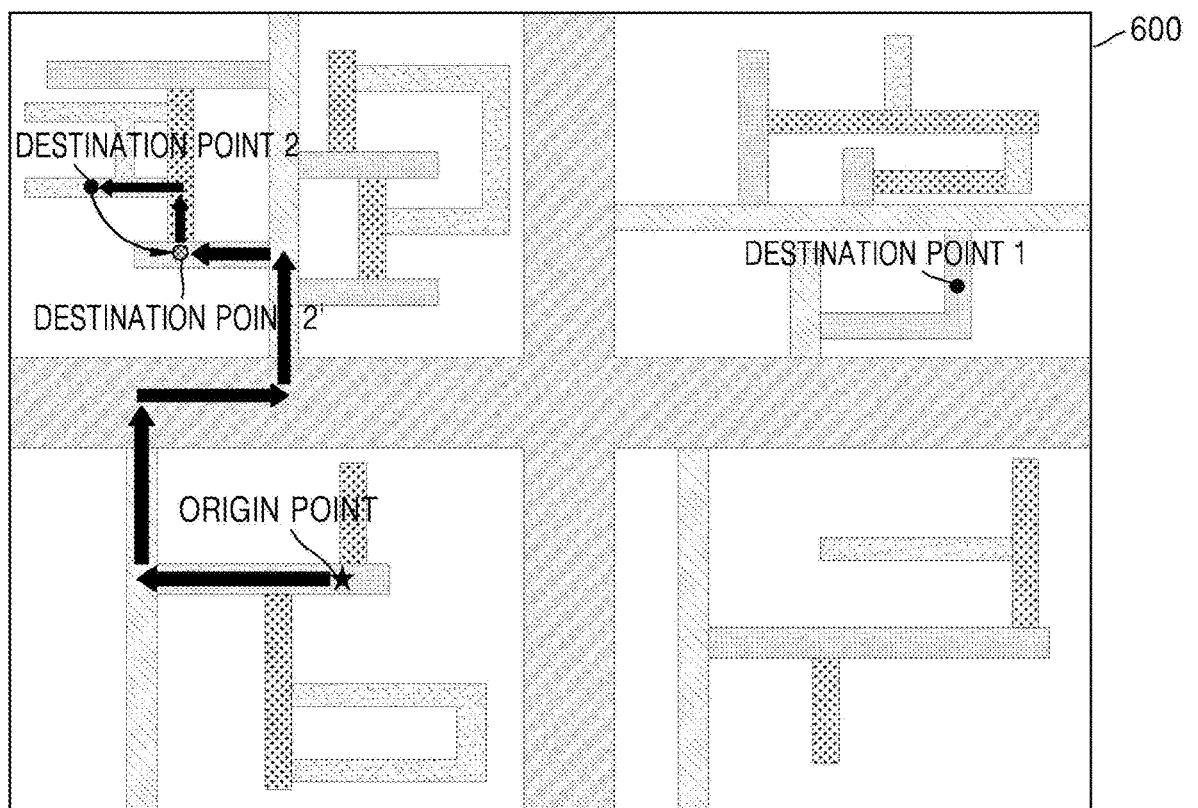

FIGS. 6A to 6C are views for describing an example of generating a travel path between an origin point and a final location of a destination point according to an embodiment.

Referring to FIGS. 6A to 6C, roads of class 1 to class 5 are shown on a map 600. Destination point 1 may be located on the road of class 3, and destination point 2 may be located on the road of class 5.

Hereinafter, it is assumed that a distance between an origin point and each of destination points 1 and 2 is less than a threshold value, and the P2M path-finding method is applied to generate travel paths between the origin point and destination points 1 and 2.

The travel path generation server 2000 may obtain road classes of the destination points in a group of destination points. The travel path generation server 2000 may obtain "class 3" for the road class of destination point 1 and "class 5" for the road class of destination point 2.

In an embodiment, when the road class of the destination point is higher than or equal to a reference road class, the travel path generation server 2000 may determine a current location of the destination point as the final location of the destination point. In the following description, it is assumed that the reference road class is "class 3".

Since the road class of destination point 1 is higher than or equal to "class 3", the travel path generation server 2000 may determine a current location of destination point 1 as the final location. The travel path generation server 2000 may generate a travel path between the origin point and the final location of destination point 1, and the travel path between the origin point and the final location of destination point 1 may be the same as an arrowed path shown in FIG. 5A. Meanwhile, the travel path may vary according to criteria such as a shortest distance path, a shortest time path, and the like.

In an embodiment, when the road class of the destination point is lower than the reference road class, the travel path generation server 2000 may move the current location of the destination point to a location satisfying the reference road class and determine the moved location as the final location of the destination point.

Referring to FIG. 6A, since the road class of destination point 2 is "class 5", destination point 2 corresponds to the road class below "class 3" that is the reference road class. The travel path generation server 2000 may move the current location of destination point 2 to destination point 2', which is a location satisfying the reference road class of "class 3", and determine destination point 2' as the final location.

Meanwhile, the travel path generation server 2000 may generate and store a travel path between the location of the destination point before the movement and the location of the destination point after the movement. That is, the travel path generation server 2000 may store a travel path between destination point 2 and destination point 2'.

Referring to FIG. 6B, the travel path generation server 2000 may generate a travel path between the origin point and destination point 2'.

The travel path generation server 2000 may filter out the roads of class 4 and class 5 from the map 600. Even though the roads of class 4 and class 5 are filtered out from the map 600 as the location of destination point 2 on the road of "class 5" is moved to the location of destination point 2' on the road of "class 3", the travel path generation server 2000 can still generate the travel path between the origin point and destination point 2'.

Referring to FIG. 6C, the travel path generation server 2000 may generate a final travel path by connecting a first travel path between the origin point and the final location of the destination point shown in FIG. 6B, and a second travel path between destination point 2 and destination point 2' shown in FIG. 6A.

By moving the location of destination point 2 to that of destination point 2', the travel path generation server 2000 may generate the first travel path between the origin point and destination point 2' even though the travel path generation server 2000 performs a search by extending only to from the road of class 1 to the road of class 3, instead of extending to the roads of all classes from the road of class 1 to the road of class 5. Further, by storing the second travel path between destination point 2 and destination point 2' and connecting the first travel path and the second travel path, the travel path between the origin point and destination point 2 can be generated. That is, according to the method of the present disclosure, a search time and a travel path generation time can be reduced as compared to a case in which the travel path between the origin point and the destination point is generated by extending to the roads of all classes.

Figure 7:
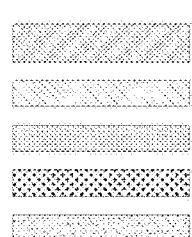
FIG. 7 is a view for describing an example of moving a destination point according to a road class of the destination point according to an embodiment.
Figure 7:
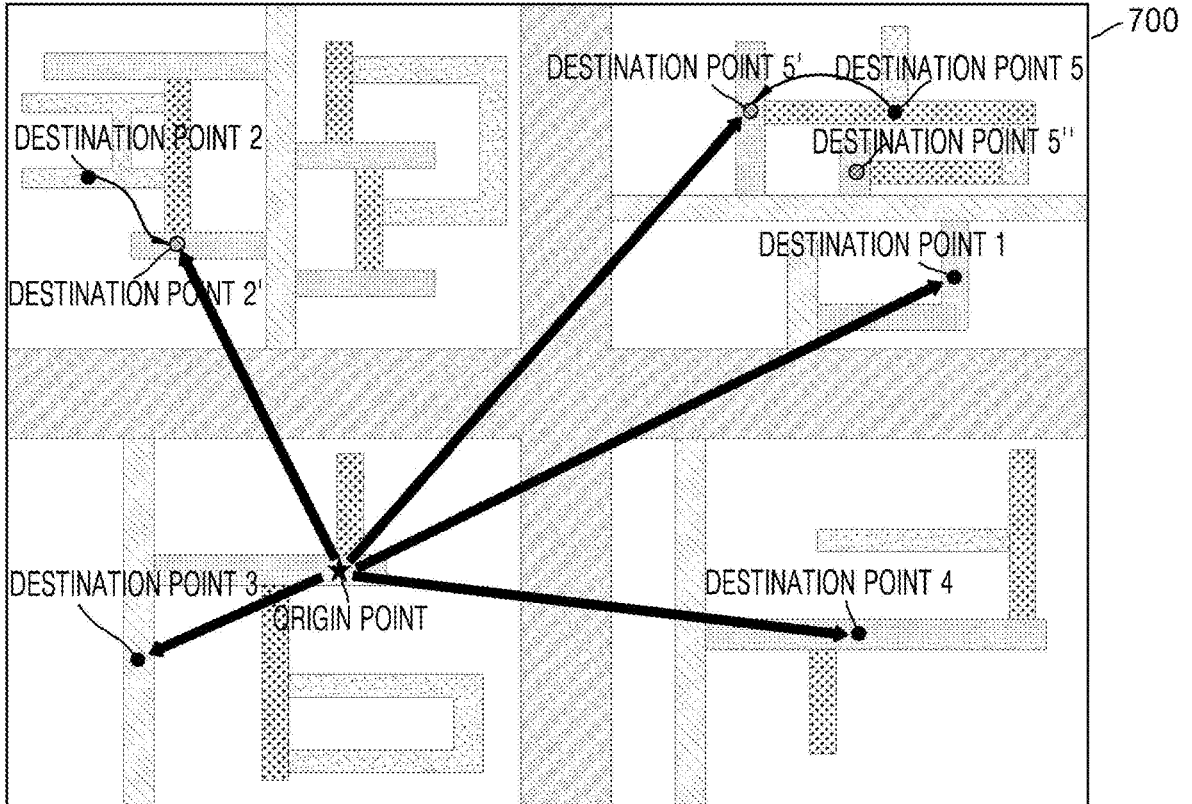

FIG. 7 is a view for describing an example of moving a destination point according to a road class of the destination point according to an embodiment.

Referring to FIG. 7, roads of class 1 to class 5 are shown on a map 700. A group of destination points may include destination point 1 to destination point 5. Destination point 1 may be located on the road of class 3, destination point 2 may be located on the road of class 5, destination point 3 may be located on the road of class 2, destination point 4 may be located on the road of class 3, and destination point 5 may be located on the road of class 4.

In the following description, it is assumed that a distance between an origin point and each of destination points 1 to 5 corresponds to a distance less than a threshold value, and thus the P2M path-finding method is applied to generate the travel paths between the origin point and destination points 1 to 5.

The travel path generation server 2000 may determine a current location of the destination point as a final location of the destination point when the road class of the destination point is higher than or equal to a reference road class. In the following description, it is assumed that the reference road class is "class 3".

Since the road class of each of destination point 1, destination point 3, and destination point 4 is higher than or equal to "class 3", the travel path generation server 2000 may determine the current locations of destination point 1, destination point 3, and destination point 4 as final locations.

When the road class of the destination point is lower than the reference road class, the travel path generation server 2000 may move the current location of the destination point to a location satisfying the reference road class and determine the moved location as the final location of the destination point.

The road classes of destination point 2 and destination point 5 are "class 5" and "class 4", respectively, and thus destination point 2 and destination point 5 correspond to classes less than "class 3", which is the reference road class. The travel path generation server 2000 may move the current locations of destination point 2 and destination point 5 to destination point 2' and destination point 5', respectively, which are locations satisfying the reference road class of "class 3", and determine destination point 2' and destination point 5' as the final locations.

In an embodiment, a shortest distance path method may be used to move the current location of the destination point having a class lower than the reference road class to a location that satisfies the reference road class. In another embodiment, a shortest time path method may be used to move the current location of the destination point having a class lower than the reference road class to a location that satisfies the reference road class. For example, when the shortest distance path method is applied, the travel path generation server 2000 may move the current location of the destination point 5 to the location of destination point 5'. Alternatively, when the shortest time path method is applied, the travel path generation server 2000 may move the current location of the destination point 5 to a location of destination point 5" rather than the destination point 5'.

In an embodiment, the reference road class may be variable depending on the road class of the destination point in the group of destination points. Specifically, the travel path generation server 2000 may determine the road class, which satisfies to be higher than or equal to a preset road class from among road classes of input destination points and on which the destination points are mostly located, as the reference road class. For example, the road classes may be divided into class 1 to class 9, and the preset road class may be set to class 5. In this case, when the input destination points are mostly located on the road of class 4, the travel path generation server 2000 may determine "class 4" as the reference road class. Alternatively, when the input destination points are mostly located on the road of class 3, the travel path generation server 2000 may determine "class 3" as the reference road class. However, when the input destination points are mostly located on the road of class 6, class 6 is not determined as the reference road class since class 6 does not correspond to a class higher than or equal to the preset road class, i.e., class 5.

In another embodiment, the reference road class may be variable depending on a traveling means traveling the travel path. Specifically, when a reference number of passengers in the traveling means is greater than or equal to a predetermined number, or the size of the traveling means is greater than a predetermined size, the reference road class may be set to a first class. On the contrary, when the reference number of passengers in the traveling means is less than the predetermined number, or the size of the traveling means is less than the predetermined size, the reference road class may be set to a second class. Here, the first class may be a higher class than the second class. Since there may be a road class that is difficult to move depending on the traveling means, the present disclosure may take this into account to determine the reference road class.

Figure 8:
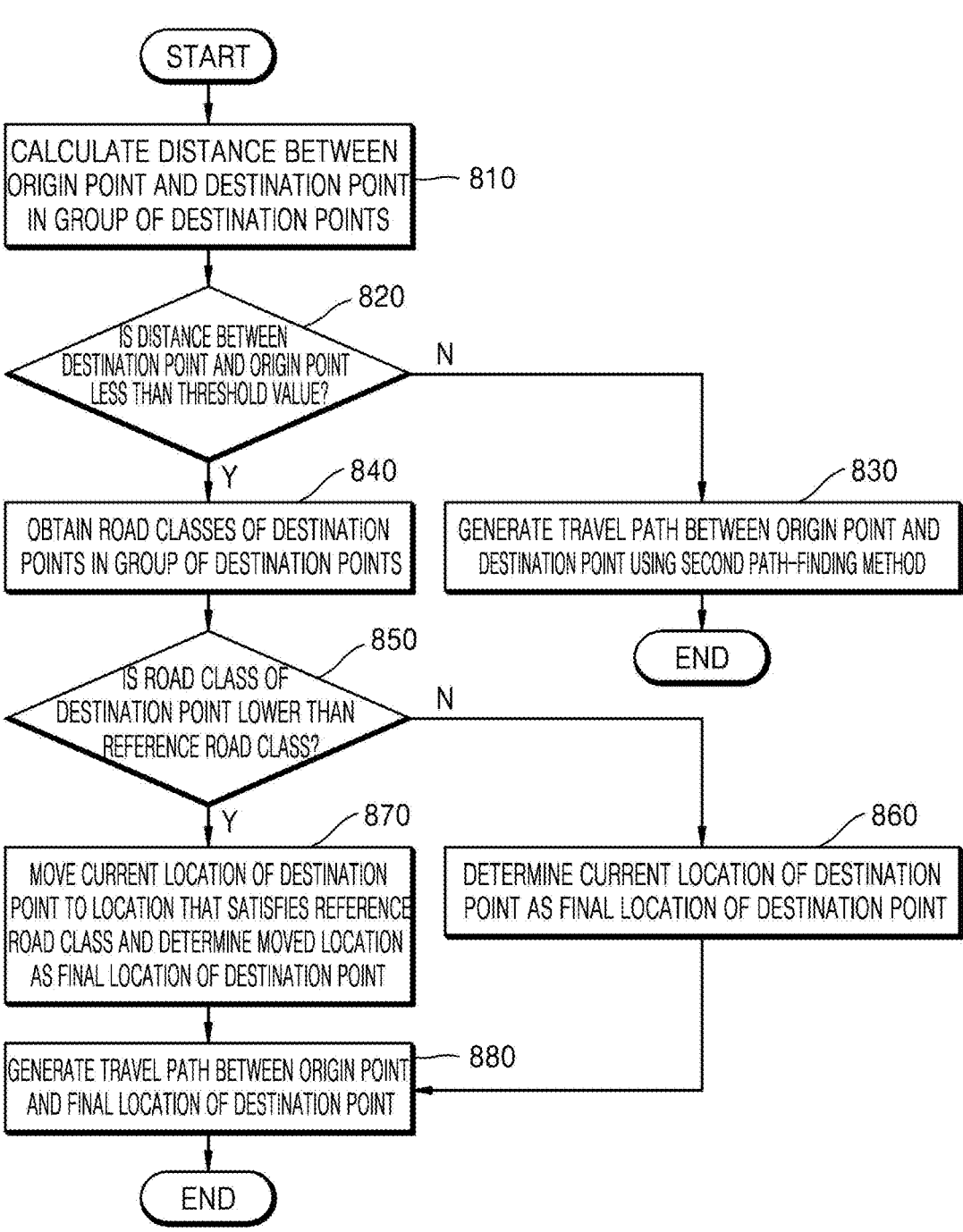
FIG. 8 is a flowchart illustrating a method of generating multiple travel paths according to an embodiment.

FIG. 8 is a flowchart of a method of generating multiple travel paths according to an embodiment.

Since the method of generating travel paths shown in FIG. 8 is related to the embodiments described with reference to the drawings described above, even though contents are omitted below, the contents described with reference to the preceding drawings may also be applied to the method of FIG. 8.

Referring to FIG. 8, in operation 810, a processor may calculate a distance between an origin point and a destination point in a group of destination points.

In operation 820, the processor may determine whether the distance between the destination point and the origin point is less than a threshold value.

A distance calculation method may use a straight-line distance, a shortest distance, a shortest time, or the like, and the threshold value may be set to 5 km, 10 km, 15 km, 20 km, or the like, but the distance calculation method and the threshold value are not limited thereto.

When the distance between the destination point and the origin point is higher than or equal to the threshold value, the method proceeds to operation 830.

In operation 830, the processor may generate a travel path between the origin point and the destination point using a second path-finding method.

The second path-finding method may be the P2P path-finding method.

When the distance between the destination point and the origin point is less than the threshold value, the method proceeds to operation 840.

Operations 840 to 880 relate to a method of generating a travel path using a first path-finding method. The first path-finding method may be the P2M path-finding method.

In operation 840, the processor may obtain road classes of the destination points in the group of destination points.

The roads may be classified based on predetermined criteria. Network connectivity should be corrected between roads of the same class. In an embodiment, the roads may be classified from class 1 to class 9 based on the predetermined criteria. The predetermined criteria may include a road type, a road traffic volume, a road width, a road length, and the like, but the present disclosure is not limited thereto.

In operation 850, the processor may determine whether the road class of the destination point is lower than a reference road class.

In an embodiment, the reference road class may be variable depending on the road class of the destination point in the group of destination points. Specifically, the processor may determine the road class, which satisfies to be higher than or equal to a preset road class from among road classes of input destination points and on which the destination points are mostly located, as the reference road class.

In another embodiment, the reference road class may be variable depending on a traveling means traveling the travel path. Specifically, when a reference number of passengers in the traveling means is greater than or equal to a predetermined number, or the size of the traveling means is greater than a predetermined size, the reference road class may be set to a first class. On the contrary, when the reference number of passengers in the traveling means is less than the predetermined number, or the size of the traveling means is less than the predetermined size, the reference road class may be set to a second class. Here, the first class may be a higher class than the second class.

When the road class of the destination point is higher than or equal to the reference road class, the method proceeds to operation 860.

In operation 860, the processor may determine a current location of the destination point as a final location of the destination point.

When the road class of the destination point is lower than the reference road class, the method proceeds to operation 870.

In operation 870, the processor may move the current location of the destination point to a location that satisfies the reference road class, and determine the moved location as the final location of the destination point.

In an embodiment, a shortest distance path method may be used to move the current location of the destination point having a class lower than the reference road class to a location that satisfies the reference road class. In another embodiment, a shortest time path method may be used to move the current location of the destination point having a class lower than the reference road class to a location that satisfies the reference road class.

In operation 880, the processor may generate a travel path between the origin point and the final location of the destination point. The processor may generate the travel path by determining a travel sequence to the destination point in the group of destination points using Nearest Insertion (NI), Cheapest Insertion (CI), Farthest Insertion (FI), Random Insertion (RI), Evolutionary Algorithm, or the like.

Figure 9:
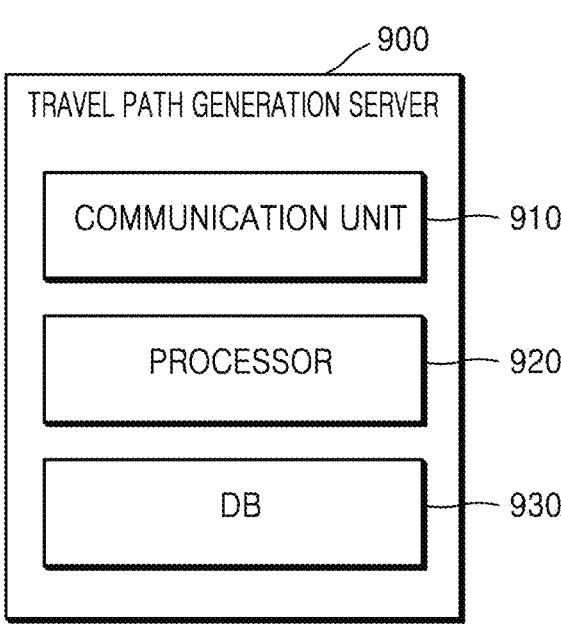
FIG. 9 is a block diagram of a travel path generation server according to an embodiment.

FIG. 9 is a block diagram of a travel path generation server according to an embodiment.

Referring to FIG. 9, a travel path generation server 900 may include a communication unit 910, a processor 920, and a database (DB) 930. Only components related to the embodiment are shown in the travel path generation server 900 of FIG. 9. Accordingly, it may be understood by a person skilled in the art that other general-purpose components may be further included in addition to the components shown in FIG. 9.

The communication unit 910 may include one or more components that enable wired or wireless communication with user terminals and external servers. For example, the communication unit 910 may include at least one of a short-range communication unit (not shown), a mobile communication unit (not shown), and a broadcast receiver (not shown).

The DB 930 is hardware for storing various types of data processed in the travel path generation server 900, and may store programs for processing and controlling the processor 920. The DB 930 may store travel-related information, user information, and the like.

The DB 930 may include a random access memory (RAM) such as a dynamic random access memory (DRAM) or a static random access memory (SRAM), a read-only memory (ROM), an electrically erasable programmable read-only memory (EEPROM), CD-ROM, Blu-ray or another optical disk storage, a hard disk drive (HDD), a solid-state drive (SSD), or a flash memory.

The processor 920 controls overall operations of the travel path generation server 900. For example, the processor 920 may control, in overall, an input unit (not shown), a display (not shown), the communication unit 910, the DB 930, and the like by executing the programs stored in the DB 930. The processor 920 may control operations of the travel path generation server 900 by executing the programs stored in the DB 930.

The processor 920 may control at least some of the operations of the application described above with reference to FIGS. 1 to 8.

The processor 920 may be implemented using at least one of application-specific integrated circuits (ASICs), digital signal processors (DSPs), digital signal processing devices (DSPDs), programmable logic devices (PLDs), field-programmable gate arrays (FPGAs), microprocessors, and electrical units for performing other functions.

The embodiments according to the present disclosure may be implemented in the form of a computer program that can be executed through various components on a computer, and such a computer program may be recorded on a computer-readable medium. The medium may include hardware devices specially configured to store and execute program instructions, including magnetic media such as a hard disk, a floppy disk, and a magnetic tape, optical media such as a compact disc read-only memory (CD-ROM) and a digital versatile disk (DVD), magneto-optical media such as a floptical disk, and solid state drives such as a read-only memory (ROM), a random access memory (RAM), and a flash memory.

Meanwhile, the computer program may be a program specially designed and configured for the present disclosure or a program known and usable to those skilled in the computer software field. Examples of the computer program include machine language codes generated by a compiler as well as high-level language codes which are executable by a computer using an interpreter or the like.

According to an embodiment, the method according to various embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., Play Store™), or between two user devices (e.g., smart phones) directly. When distributed online, at least a part of the computer program product may be temporarily generated or at least temporarily stored in the machine-readable storage medium, such as memory of the manufacturer's server, a server of the application store, or a relay server.

The operations of all methods described herein can be performed in any suitable order unless otherwise indicated herein or otherwise clearly contradicted by context. The present disclosure is not limited to the described order of the operations. The use of any and all examples, or exemplary terms (e.g., "such as") provided herein, is intended merely to better illuminate the present disclosure and does not pose a limitation on the scope of the present disclosure unless otherwise claimed. Further, those skilled in the art can appreciate that, various modifications, combinations, and changes are possible without departing from the scope of the appended claims or equivalents thereof.

Accordingly, it should be noted that the spirit of the present disclosure is not limited to the embodiments described above, and not only the claims to be described later, but also all ranges equivalent to or equivalently changed from the claims fall within the scope of the spirit of the present disclosure.

The invention claimed is:

1. A method of performing multipath search, the method comprising: obtaining an origin point on a geographic map displayed on a user terminal selected via a first user input and a destination point, in a group of destination points, on the geographic map displayed on the user terminal selected via a second user input; filtering the geographic map to remove roads having a lower class than a reference road class; calculating a geographic distance between the origin point and the destination point in a group of destination points; and generating a travel path data between the origin point and the destination point using a first path-finding method when the geographic distance between the destination point and the origin point is less than a reference geographic distance, and generating the travel path data between the origin point and the destination point using a second path-finding method when the geographic distance between the destination point and the origin point is greater than or equal to the reference geographic distance, wherein the generating of the travel path data using the first path-finding method includes: obtaining a road class of the destination point in the group of destination points; determining a final location of the destination point by, in response to the road class of the destination point being higher than or equal to the reference road class, determining a current location of the destination point as the final location of the destination point, and in response to the road class of the destination point being lower than the reference road class, automatically moving the current location of the destination point to a location satisfying the reference road class on the filtered geographic map by using a shortest distance path method or a shortest time path method and determining the moved location as the final location of the destination point; generating a travel path graphic between the origin point and the final location of the destination point based on the travel path data; and controlling user terminal to display the generated travel path graphic on the filtered geographic map; wherein the travel path data between the origin point and the final location of the destination point is generated by the filtering out the roads having a lower road class than the reference road class.

2. The method of claim 1, wherein
the first path-finding method is a point-to-multi-point (P2M) path-finding method, and
the second path-finding method is a point-to-point (P2P) path-finding method.

3. The method of claim 1, wherein
the reference road class is variable according to a traveling means to travel from the origin point to the destination point.

4. The method of claim 1, wherein the reference road class is variable according to the road class of the destination point in the group of destination points.

5. A non-transitory computer-readable recording medium recording a program for executing the method of claim 1 on a computer.

6. An apparatus for performing multipath search, the apparatus comprising: a memory in which at least one program is stored; and a processor configured to perform a calculation by executing the at least one program, wherein the processor performs: obtaining an origin point on a geographic map displayed on a user terminal selected via a first user input and a destination point, in a group of destination points, on the geographic map displayed on the user terminal selected via a second user input; filtering the geographic map to remove roads having a lower class than a reference road calculating a geographic distance between the origin point and the destination point in a group of destination points; and generating a travel path data between the origin point and the destination point using a first path-finding method when the geographic distance between the destination point and the origin point is less than a threshold value reference geographic distance, and generating the travel path data between the origin point and the destination point using a second path-finding method when the geographic distance between the destination point and the origin point is greater than or equal to the reference geographic distance, wherein the processor performs: obtaining a road class of the destination point in the group of destination points; determining a final location of the destination point by, in response to the road class of the destination point being higher than or equal to a reference road class, determining a current location of the destination point as the final location of the destination point, and in response to the road class of the destination point being lower than the reference road class, automatically moving the current location of the destination point to a location satisfying the reference road class on the filtered geographic map by using a shortest distance path method or a shortest time path method and determining the moved location as the final location of the destination point; generating a travel path graphic between the origin point and the final location of the destination point based on the travel path data; and controlling user terminal to display the generated travel path graphic on the filtered geographic map, wherein the travel path data between the origin point and the final location of the destination point is generated by the filtering out the roads having a lower road class than the reference road class.

7. The apparatus of claim 6, wherein
the first path-finding method is a point-to-multi-point (P2M) path-finding method, and
the second path-finding method is a point-to-point (P2P) path-finding method.

8. The apparatus of claim 6, wherein the processor varies the reference road class according to the road class of the destination point in the group of destination points.

* * * * *